United States Patent [19]

Pavlisko et al.

[11] Patent Number: 4,971,873
[45] Date of Patent: Nov. 20, 1990

[54] SOLVENT SOLUBLE POLYIMIDES AS BINDERS IN PHOTOCONDUCTOR ELEMENTS

[75] Inventors: Joseph A. Pavlisko; William J. Staudenmayer, both of Pittsford, N.Y.

[73] Assignee: Eastman Kodak Company, Rochester, N.Y.

[21] Appl. No.: 429,950

[22] Filed: Oct. 30, 1989

[51] Int. Cl.$^5$ .................. G03G 5/047; G03G 5/04; G03G 5/14
[52] U.S. Cl. .................................. 430/58; 430/59; 430/64; 430/96
[58] Field of Search .................. 430/59, 64, 96

[56] References Cited
U.S. PATENT DOCUMENTS
3,856,752 12/1974 Bateman et al. ............... 528/353
4,830,953 5/1989 Bateman ........................ 430/197

FOREIGN PATENT DOCUMENTS
56-150741 11/1981 Japan.

Primary Examiner—Roland E. Martin
Attorney, Agent, or Firm—Dressler, Goldsmith, Shore, Sutlker & Milnamow, Ltd.

[57] ABSTRACT

A photoconductor element which employs a solvent soluble polyimide as the polymeric binder in at least one layer thereof. The polyimide is characterized by the formula:

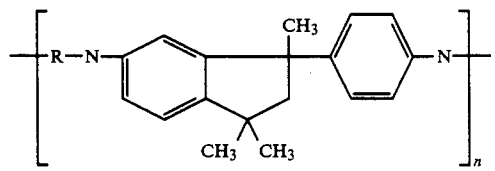

where R is a dianhydride and n is an integer in the range of 50 to 450.

8 Claims, No Drawings

SOLVENT SOLUBLE POLYIMIDES AS BINDERS IN PHOTOCONDUCTOR ELEMENTS

FIELD OF THE INVENTION

This invention is in the field of photoconductor elements that incorporate solvent soluble polyimide binders.

BACKGROUND OF THE INVENTION

Many polymeric binders are known for use in photoconductor elements wherein the binder is solvent soluble, yet, when in a solid form, displays fairly high physical strength, dielectric strength, and electrical insulating properties.

The performance characteristics of, and the processing temperatures associated with the manufacture of, photoconductor elements are influenced by, and even limited by, such polymer binder properties as the glass transition temperature ($T_g$) and photosensitivity.

A solvent soluble polymer which could be used as a binder in photoconductor elements and which would have a high Tg and a high binding capacity would have value and utility. A polymer binder with both such improved properties has now been discovered.

SUMMARY OF THE INVENTION

This invention is directed to photoconductor elements containing a solvent soluble polyimide binder having the formula:

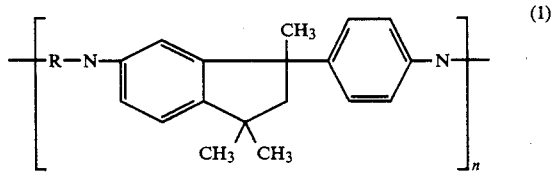

(1)

where R is a dianhydride and n is an integer in the range of 50 to 450.

Preferred polyimides have the formula:

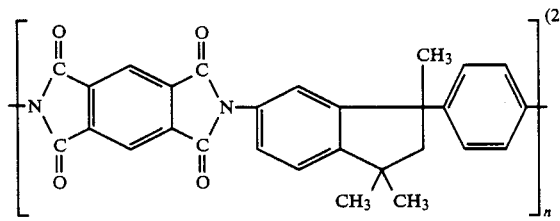

(2)

where n is an integer in the range of 50 to 450.

Incorporation of the polyimide binder of Formula 1 into photoconductor elements produces surprising and unexpected results. For example, the binder allows a photoconductor to have increased spectral sensitivity. Evidently, the binder exerts a bipolar binding effect upon materials dispersed therein, such as photoconductors and charge transfer agents which enhances spectral sensitivity.

The binder also has a higher glass transition temperature ($T_g$) than polymers heretofore now known to have been previously used in photoconductor elements. This high $T_g$ is particularly surprising because the binder is still soluble in solvents commonly used for coating layers in photoconductor elements at ambient conditions.

Such a high $T_g$ provides improved thermal stability characteristics to photoconductor elements and also permits use of higher temperatures during the electrophotography process, as for example in a thermal transfer process.

The polyimide binders of Formula 1 are particularly useful as vehicles for both n-type and p-type photoconductors.

Furthermore, the binders achieve the foregoing advantages and characteristics while still providing very high physical strength, electrical insulation, dielectric strength and high photosensitivity.

More particularly, the present invention is directed to new and improved photoconductor elements containing a solvent soluble polyimide binder of Formula 1 in:

(a) the barrier layer;

(b) the charge generating layer of a single-layer photoconductive element; or (c) a charge generating layer and/or a charge transport layer of a multiactive photoconductor element, and combinations thereof.

In photoconductor elements of the present invention, the charge transport layer preferably comprises a composition of at least one n-type, or at least one p-type photoconductor dispersed in a binder comprised of a solvent soluble polyimide of Formula 1.

Other and further advantages, features, purposes and the like that are associated with the present invention will be apparent to those skilled in the art from the accompanying specification taken with the accompanying specification and appended claims.

DETAILED DESCRIPTION

The solvent soluble polyimides of Formula (1) can be made by methods known to the prior art; see, for example, U.S. Pat. No. 3,856,752, Japanese Patent No. 56150741, and European patent application No. 102745A.

The photoconductor elements of this invention can employ polymeric film or sheet materials as a nonconducting support. Presently preferred polymers include cellulose acetates, polystyrenes, polycarbonates, polyesters such as polyethylene terephthalate, and the like.

The support layer is associated with an electrically conductive layer. Various electrically conductive layers that are known in the photoconductor element art can be employed. For example, the conductive layer can be a metal foil which is conventionally laminated onto the support layer. Suitable metal foils include those comprised of aluminum, zinc, copper, and the like. Vacuum vapor deposited metal layers, such as silver, chromium, nickel, aluminum, and the like are presently preferred. The thickness of a vapor deposited metal layer can be in the range of about 100 to about 2000 Angstroms. The conductive layer can also be comprised of particles of a conductor or semiconductor dispersed in a binder. For example, a conducting layer can be comprised of compositions of protective inorganic oxide and about 30 to about 70 weight percent of conductive metal particles such as a vapor deposited conductive cermet layer as described in U.S. Pat. No. 3,880,657. See also the teachings of U.S. Pat. No. 3,245,833 relating to conductive layers employed with barrier layers. Organic conductive layers can be employed, such as a layer comprised of a sodium salt of a carboxy ester lactone of maleic anhydride and a vinyl acetate polymer as taught in U.S. Pat. Nos. 3,007,901 and 3,262,807. If desired, the support layer and the conductive layer can be combined into a single structure. For example, metal plates can be used such as those comprised of aluminum, copper, zinc, brass and galvanized metals.

A barrier layer is coated over the conductive layer. Preferably, the barrier layer is comprised of a polyimide of Formula (1). However, if desired, the barrier layer can comprise a film-forming organic polymer of the type known to, and used in, the photoconductor element art as a binder, or the like. Such a polymer is preferably soluble in organic solvents, and, in solid form, displays dielectric strength and electrically insulating properties. Suitable polymers include, for example, butadiene copolymers, such as styrene-butadiene copolymers; polyvinyl toluene-styrene copolymers; silicone resins; styrene-alkyd resins; silicone-alkyd resins; soya-alkyd resins; poly(vinyl chloride); poly(vinylidene chloride); vinylidene chloride-acrylonitrile copolymers; poly(vinyl acetate); vinyl acetate-vinyl chloride copolymers; poly(vinyl acetals), such as poly(vinyl butyral); polyacrylic and methacrylic esters, such as poly(methyl methacrylate), poly(n-butyl methacrylate), poly(isobutyl methacrylate), etc.; polystyrene; nitrated polystyrene; polymethylstyrene; polyisobutylene polymers; polyesters, such as poly[ethylene-co-alkylenebis-(alkylene-oxyaryl)-phenylene dicarboxylate]; phenol formaldehyde resins; ketone resins; polyimides; polycarbonates; polythiocarbonates; poly[ethylene-coisopropylidene-2,2-bis(ethylene-oxyphenylene) terephthalate]; cellulose esters such as cellulose nitrate; poly(vinyl-pyrrolidone); copolymers of vinyl haloarylates and vinyl acetate, such as poly(vinyl-m-bromobenzoate-co-vinyl acetate); chlorinated polyolefins, such as chlorinated polyethylene, etc.; and the like. Preferred polymers are polyimides, cellulose nitrate and poly(vinyl acetate).

Typically, barrier layers have thicknesses in the range of about 0.1 to about 2 microns. However, when a barrier layer is comprised of a solvent soluble polyimide of the present invention, the barrier layer thickness can be reduced because of the properties associated with such soluble polyimides. A present preference, when employing a solvent soluble polyimide of Formula (1), is to employ a barrier layer in the thickness range of about 0.05 to about 1 micron.

The barrier layer is conveniently applied as an overcoating upon a conductive layer using a barrier layer coating composition. In such a composition, the polyimide of Formula (1) is dissolved in a solvent. Preferred solvents are volatile (that is, evaporatable) at temperatures below about 50° C.

Examples of suitable solvents include aromatic hydrocarbons, such as benzene, toluene, xylene, mesitylene, etc.; ketones, such as acetone, 2-butanone, etc.; ethers, such as cyclic ethers, like tetrahydrofuran, methyl ethyl ether, petroleum ether, etc.; halogenated aliphatic hydrocarbons, such as chloroform, methylene dichloride, and ethylene chloride, etc.; alcohols, such as isopropyl alcohol, etc.; and the like. Presently preferred solvents are chlorinated hydrocarbons.

For purposes of coating efficiency, it is convenient to incorporate into a coating composition containing the dissolved polyimide of Formula (1) minor amounts of optional additives, such as surfactants, levelers, plasticizers, and the like. A preferred additive is a surfactant.

On a 100 weight percent total solids basis, a barrier layer coating composition of this invention comprises greater than about 99 weight percent of a polyimide polymer of Formula (1), and, the balance constituting additives. In such a coating composition, the total solids content can vary, but is preferably in the range of about 0.1 to about 10 weight percent with the balance up to 100 weight percent thereof being the solvent.

Such a coating composition is conveniently applied by using a technique such as knife coating (presently preferred), spray coating, swirl coating, extrusion hopper coating, or the like. After application, a coating is air dried.

A photoconductive charge generating layer is preferably applied over the barrier layer. Preferably, the photoconductive charge generating layer is comprised of a photoconductor which is dispersed in binder comprising a polyimide resin of Formula (1).

Photoconductors are well known to the art. In the practice of this invention it is preferred to employ n-type photoconductors in the charge generating layer, or for photoconductors charging with the opposite polarity, a p-type photoconductor can be used.

Alternatively, the photoconductor can be dispersed in a conventional polymeric binder. Examples of suitable binders are hereinabove provided in reference to the barrier layer.

A photoconductive charge generating layer can have a thickness which varies over a wide range. Typical thicknesses are in the range of about 0.05 to about 5 microns. As those skilled in the art will appreciate, as layer thickness increases, a greater proportion of incident radiation is absorbed by the layer, but the likelihood increases of trapping a charge carrier which then does not contribute to image formation. Thus, an optimum thickness for a given charge generating layer can constitute a balance between these competing influences for a given charge generating layer composition.

Photoconductors suitable for use in the charge generating layer include inorganic and organic, including metal organic and polymeric, photoconductors. Inorganic photoconductors include, for example, zinc oxide, lead oxide, selenium, and the like. Various particulate organic pigment materials, such as phthalocyanine pigment, and a wide variety of organic compounds can be used. A partial listing of representative photoconductive materials may be found, for example, in Research Disclosure, Vol. 109, May, 1973, pg. 61, in an article entitled "Electrophotographic Elements, Materials and Processes", particularly at paragraph IV(A) thereof. For purposes of this invention, a photoconductor in the dark is electrically insulating, but, upon exposure to actinic radiation, becomes electrically conductive. Preferably, the dark resistivity of a photoconductor used in the practice of this invention is greater than about $10^{11}$ ohm-centimeters (ohm-cm) at 25° C. and this resistivity is rapidly reduced by several orders of magnitude when the photoconductor is exposed to actinic radiation, for example radiation at an intensity of about 5 to about 50 ergs per sq. cm per second (ergs/cm$^2$/sec).

Examples of suitable organic photoconductors include phthalocyanine pigments, such as the bromoindium phthalocyanine pigment described in U.S. Pat. No. 4,727,139 or the titanylphthalocyanine pigments described in U.S. Pat. No. 4,701,396; arylamines, such as those described in U.S. Pat. Nos. 3,240,597 and 3,180,730; polyarylalkanes, such as those described in U.S. Pat. Nos. 3,274,000; 3,542,544; and 3,542,547; 4-diarylamino substituted chalcones, such as those described in U.S. Pat. No. 3,526,501; non-ionic cycloheptenyl compounds, such as those described in U.S. Pat.

No. 3,533,786; compounds containing an N-N nucleus, such as those described in U.S. Pat. No. 3,542,546; compounds containing a 3,3'-bis-aryl-2-pyrazoline nucleus such as those described in U.S. Pat. No. 3,527,602; triarylamines in which at least one of the aryl radicals is substituted by at least one of (a) vinyl radical, (b) a vinyl radical having at least one active hydrogen-containing group, or (c) an active hydrogen-containing group, such as those described in U.S. Pat. Nos. 3,567,450 and 3,658,520; organo-metallic compounds having at least one aminoaryl substituent attached to a Group IVA or Group VA metal atom, such as those described in U.S. Pat. No. 3,647,429; organo-metallic compounds having at least one aminoaryl substituent attached to a Group III a metal atom, such as those described in U.S. Pat. No. 3,607,257; and the like. Mixtures of photoconducters can be used.

Illustrative n-type organic photoconductive materials include strong Lewis acids such as organic, including metallo-organic, materials containing one or more aromatic, including aromatically unsaturated heterocyclic, materials bearing an electron withdrawing substituent. These materials are considered useful because of their characteristic electron accepting capability. Typical electron withdrawing substituents include cyano and nitro groups; sulfonate groups; halogens such as chlorine, bromine, and iodine; ketone groups; ester groups; acid anhydride groups; and other acid groups such as carboxyl and quinone groups. A partial listing of such representative n-type aromatic Lewis acid materials having electron withdrawing substituents includes phthalic anhydride, tetrachlorophthalic anhydride, benzil, mellitic anhydride, S-tricyanobenzene, picryl chloride, 2,4-dinitrochlorobenzene, 2,4-dinitrobromobenzene, 4-nitrobiphenyl, 4,4-dinitrobiphenyl, 2,4,6-trinitroanisole, trichlorotrinitrobenzene, trinitro-o-toluene, 4,6-dichloro-1,3-dinitrobenzene, 4,6-dibromo-1,3-dinitrobenzene, P-dinitrobenzene, chloranil, bromanil, 2,4,7-trinitro-9-fluorenone, 2,4,5,7-tetranitrofluorenone, trinitroanthracene, dinitroacridene, tetracyanopyrene, dinitroanthraquinone, and mixtures thereof.

Other useful n-type charge-transport materials which may be employed in the present invention are conventional n-type organic photoconductors, for example, complexes of 2,4,6-trinitro-9-fluorenone and poly(vinyl-carbazole) provide useful n-type charge-transport materials. Still other n-type organic, including metallo-organo, photoconductive materials useful as n-type charge-transport materials in the present invention are any of the organic photoconductive materials known to be useful in electrophotographic processes such as any of the materials described in Research Disclosure, Vol. 109, May, 1973, pages 61-67, paragraph IV (A) (2) through (13) which are n-type photoconductors. The foregoing Research Disclosure article is incorporated herein by reference thereto.

Particularly when n-type photoconductors are used in combination with a solvent soluble polyimide binder polymer of Formula 1, one can obtain charge generating layers having increased photosensitivity compared to corresponding charge generating layers made with prior art binder polymers.

The charge generation layer is applied from a charge generation coating composition. In addition to the photoconductor(s), and the binder polymer, the coating composition may contain optional additives, such as surfactants, levelers, plasticizers, sensitizers, and the like.

The solids comprising a charge generation layer on a 100 weight percent total basis typically comprise about 0 to about 40 weight percent of photoconductor, about 0 to about 60 weight percent of polymeric binder, and about 0 to about 5 weight percent of total additives. In the coating composition, all solids are preferably dissolved. Preferably the composition contains from about 8 to about 15 weight percent of solids with the balance up to 100 weight percent thereof being solvent.

Suitable solvents are as above identified herein in relation to the barrier layer. Mixtures of different solvents can be employed. As in the case of a barrier layer composition, a photoconductive charge generating layer coating composition is conveniently applied using a technique such as above described. After coating, the charge generating composition is conveniently air dried.

The charge generating layer is preferably overcoated with a charge transport layer. The charge transport layer is of the p- or n-type. The charge transport layer is employed in a multiactive, or multi-layered, photoconductor element of the invention. Preferably a charge transport layer employs as the binder a polyimide of Formula (1). Typically, a charge transport layer has a thickness in the range of about 3 to about 30 microns although thicker and thinner charge transport layers can be employed.

The charge transport agents employed in charge transport layers preferentially accept and transport either positive charges (holes) or negative charges (electrons), although materials are known which will transport both positive and negative charges. Those exhibiting a preference for conduction of positive charge carriers are called p-type charge transport materials, and those exhibiting a preference for the conduction of negative charges are called n-type charge transport agents.

Various n-type or p-type organic compounds can be used in the charge transport layer. Representative p-type charge transport compounds include:

1. Carbazoles including carbazole, N-ethyl carbazole, N-isopropyl carbazole, N-phenyl carbazole, halogenated carbazoles, various polymeric carbazole materials such as poly(vinyl) carbazole), halogenated poly(vinyl carbazole), and the like.

2. Arylamines including monoarylamines, diarylamines, triarylamines and polymeric arylamines. Specific arylamine organic photoconductors include the nonpolymeric triphenylamines illustrated in U.S. Pat. No. 3,180,730; the polymeric triarylamines described in U.S. Pat. No. 3,240,597; the triarylamines having at least one of the aryl radicals substituted by either a vinyl radical or a vinylene radical having at least one active hydrogen-containing group, as described in U.S. Pat. No. 3,567,450; the triarylamines in which at least one of the aryl radicals is substituted by an active hydrogen-containing group, as described by U.S. Pat. No. 3,658,520; and tritolylamine.

3. Polyarylalkanes of the type described in U.S. Pat. Nos. 3,274,000; 3,542,547; and 3,615,402. Preferred polyarylalkane photoconductors are of the formula:

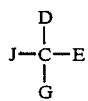

wherein:

D and G, which may be the same or different, each represent an aryl group and

J and E, which may be the same or different, each represent a hydrogen atom, an alkyl group, or an aryl group, and at least one of D, E and G contain an amino substituent. An especially useful charge-transport material is a polyarylalkane wherein J and E represent hydrogen, aryl or alkyl, and D and G represent a substituted aryl group having as a substituent thereof a group of the formula:

wherein: R is an unsubstituted aryl group such as phenyl or an alkyl-substituted aryl group such as a tolyl group. Examples of such polyarylalkanes may be found in U.S. Pat. No. 4,127,412.

4. Strong Lewis bases such as aromatic compounds, including aromatically unsaturated heterocyclic compounds free from strong electron-withdrawing groups. Examples include tetraphenylpyrene, 1-methylpyrene, perylene, chrysene, anthracene, tetraphene, 2-phenyl naphthalene, azapyrene, fluorene, fluorenone, 1-ethylpyrene, acetyl pyrene, 2,3-benzochrysens, 3,4-benzopyrene, 1,4-bromopyrene, polyvinyltetracene, polyvinyl perylene and polyvinyl tetraphene.

5. Hydrazones including the dialkylsubstituted aminobenzaldehyde(diphenylhydrazones) of U.S. Pat. No. 4,150,987; alkylhydrazones and arylhydrazones as described in U.S. Pat. Nos. 4,554,231; 4,487,824; 4,481,271; 4,456,671; 4,446,217; and 4,423,129, which are illustrative of the p-type hydrazones.

Other useful p-type charge transport agents are the p-type photoconductors described in Research Disclosure, Vol. 109, May, 1973, pages 61–67, paragraph IV(A) (2) through (13).

Representative of the preferred n-type charge transport agents are strong Lewis acids, such as organic, including metallo-organic, compounds containing one or more aromatic, including aromatically unsaturated heterocyclic, groups bearing an electron-withdrawing substituent. These are useful because of their electron-accepting capability. Typical electron withdrawing substituents include cyano and nitro; sulfonate; halogens such as chlorine, bromine and iodine; ketone groups; ester groups; acid anhydride groups; and other acid groups such as carboxyl and quinone groups. Representative n-type aromatic Lewis acids having electron-withdrawing substituents include phthalic anhydride, tetrachlorophthalic anhydride, benzil, mellitic anhydride, S-tricyanobenzene, picryl chloride, 2,4-dinitrochlorobenzene, 2,4-dinitrobromobenzene, 4-nitrobiphenyl, 4,4-dinitrobiphenyl, 2,4,6-trinitroanisole, trichlorotrinitrobenzene, trinitro-o-toluene, 4,6-dichloro-1,3-dinitrobenzene, 4,6-dibromo-1,3-dinitrobenzene, p-dinitrobenzene, chloranil, bromanil, 2,4,7-trinitro-9-fluorenone, 2,4,5,7-tetranitrofluorenone, trinitroanthracene, dinitroacridine, tetracyanopyrene, dinitroanthraquinone, and mixtures thereof.

Other useful n-type charge transport agents are conventional n-type organic photoconductors, for example, complexes of 2,4,6-trinitro-9-fluoreneone and poly(vinyl carbazole). Still others are the n-type photoconductors described in Research Disclosure, Vol. 109, May, 1973, pages 61–67, paragraph IV(a) (2) through (13).

A single charge-transport layer or more than one can be employed. Where a single charge-transport layer is employed, it can be either a p-type or an n-type substance.

In addition to the charge transport agent, the charge transport layer contains a polymeric binder in which the charge transport agent is dispersed. Preferably the polymeric binder is a solvent soluble polyimide of Formula I. However, polymeric binders known to the art can be used such as hereinabove described in relation to barrier layer polymers.

In addition to a charge transport agent and a binder, the charge transport layer coating composition may contain various optional additives, such as surfactants, levelers, plasticizers, and the like.

On a 100 weight percent total solids basis, the charge transport layer comprises about 5 to about 50 weight percent charge transport agent(s); about 10 to about 70 weight percent binder polymer; and about 0 to about 2 weight percent total additives. The charge transport layer components are conveniently dissolved in a solvent to produce a charge transport layer coating composition containing about 8 to 15 weight percent solids with a balance up to 100 weight percent thereof being solvent. Suitable solvents are as hereinabove described.

The charge transport layer coating composition is conveniently applied using a coating technique such as hereinabove indicated. After coating, the charge transport layer composition is conveniently air-dried to remove the solvent.

In the preceding discussion, the charge generating layer is located between the conducting layer and, if employed, the charge transport layer. However, it will be appreciated that other layer configurations can be employed. For example, one can utilize the so-called "inverted multilayer configuration" wherein the charge transport layer is positioned between the conductive layer and the charge generating layer.

In a photoconductor element of this invention, and as can be seen in the preceding description, the polymeric binder in the barrier layer, the photoconductive charge generation layer, and the charge transfer layer (if present) can be the solvent soluble polyimide of Formula (1) with the proviso that at least one of such layers utilizes the polyimide of Formula (1) as a binder. Preferably, the layers containing the polyimide bindeer is the charge generating layer.

Because of the high glass transition temperature ($T_g$) associated with the polyimide of Formula (1), improved thermal stability characteristics are observed in photoconductive elements formed therewith, as hereinabove described. Also, the high $T_g$ permits use of higher processing temperatures in the electrophotography process, such as those utilized in a thermal transfer process.

The term "glass transition temperature" (or $T_g$) as used herein refers to the temperature at which a polymeric material changes from a glassy polymer to a rubbery polymer. This temperature ($T_g$) can be measured by differential thermal analysis as disclosed in "Techniques and Methods of Polymer Evaluation", Vol. 1, Marcel Dekker, Inc., N.Y. 1966.

The $T_g$ associated with the solvent soluble polyimide polymers of Formula (1) is in the range of from about 325° to about 375° C., and preferred polymers have $T_g$'s in the range of about 340° to about 360° C.

The solvent solubility characteristics of the polyimides of Formula (1) are demonstrated and characterized by the fact that such polymers are typically soluble to an extent of at least about 15–20 grams per 100 milliliters of dichloromethane.

In photoconductor elements employing a polyimide of Formula (1) as the binder resin, their binding capacity results in increased photosensitivity compared to similar photoconductor elements prepared with polymeric binders known to the prior art.

Also, because of the excellent physical strength, electrical insulation, and dielectric strength associated with a polyimide of Formula (1) particularly when in film form, photoconductor elements can be produced having superior properties. For example, the thinner barrier layers can be employed, and still achieve results associated with thicker barrier layers of the prior art.

In one class of preferred multicomponent photoconductor elements of the invention, each of the barrier layer, the charge generating layer, and the charge transfer layer (if the latter is present) employ the polyimide of Formula (1) as the binder.

In another class of preferred photoconductor elements of the invention, only the charge generating layer or the charge transfer layer uses as its binder a polyimide of Formula (1).

The invention is further illustrated by the following example:

EXAMPLE 1

A polyethylene terephthalate film of about 200 microns thick (obtained commercially from Eastman Kodak Company under the trademark "ESTAR") is overcoated on one face thereof with a vacuum vapor deposited layer of nickel approximately 800 Angstroms thick. This layer had an electrical conductivity of $10^2$ ohms/cm$^2$.

The nickel layer was overcoated by hopper coating with a vinylidene chloride-acrylonitrile copolymer layer (83:17 weight ratio) (see U.S. Pat. No. 4,578,333) coated as a solution in methyl ethyl detone.

The resulting layered film was then subjected to vacuum vapor deposition as disclosed in U.S. Pat. No. 4,618,560 of a perylene dicarboximide pigment characterized by the structure:

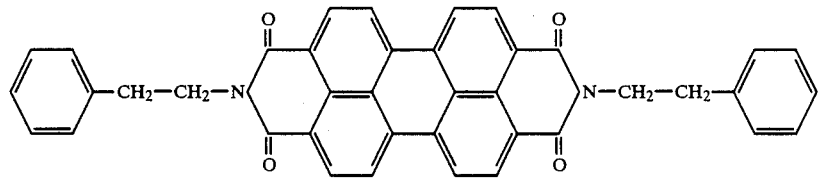

The amount deposited was 380 mg/m$^2$ which corresponds to a coating thickness of about 0.2 micron.

The charge transport layer coating formulation was prepared having the following composition:

TABLE 1

| Coating Composition for Charge Transport Layer | |
| --- | --- |
| Component | Weight |
| polymer of Formula (1) | 0.72 grams |
| charge transfer agent[1] | 0.48 grams |
| dichloromethane | 10.9 grams |

[1]The charge transfer agent was 1,1-bis(4-di-p-tolylamino-phenyl)cyclohexane.

The composition of the Table 1 was overcoated upon the perylene dicarboximide pigment layer using a coating blade, and the coating was then air-dried and cured for one hour at 60° C.

The resulting multiactive photoconductor element thus formed was charged to −500 volts and exposed to 630 nm monochromatic light. It was found that the element discharged to −100 volts with an exposure energy of 4.1 ergs/cm$^2$.

The foregoing specification is intended as illustrative and is not be taken as limited. Still other variations within the spirit and the scope of the invention are possible and will readily present themselves to those skilled in the art.

We claim:

1. A photoconductor element containing a solvent soluble polymide binder having the formula:

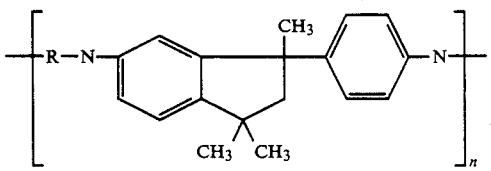

where R is a dianhydride and n is an integer in the range of 50 to 450.

2. The photoconductor element of claim 1 wherein the binder has the formula:

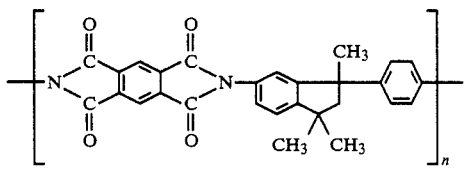

(2)

where n is an integer in the range of 50 to 450.

3. The photoconductor element of claim 1 that comprises a support layer, a conductive layer adhered to the support layer, a barrier layer adhered to the conductive layer and a charge generating adhered to the barrier layer.

4. The photoconductor element of claim 3 that further comprises a charge transport layer adhered to the charge generating layer.

5. The photoconductor element of claim 2 wherein the charge generation layer comprises an n-type photoconductor dispersed in said polyimide binder.

6. The photoconductor element of claim 3 wherein the charge generation layer comprises a p-type photoconductor dispersed in said polyimide binder.

7. The photoconductor element of claim 3 wherein the charge transport layer comprises an n-type photoconductor dispersed in said polyimide binder.

8. The photoconductor element of claim 3 wherein the charge transport layer comprises a p-type photoconductor dispersed in said polyimide binder.

* * * * *